May 15, 1923. 1,455,402
F. KOLARIK
SELF FEEDER FOR FEED CUTTERS
Filed Dec. 9, 1922
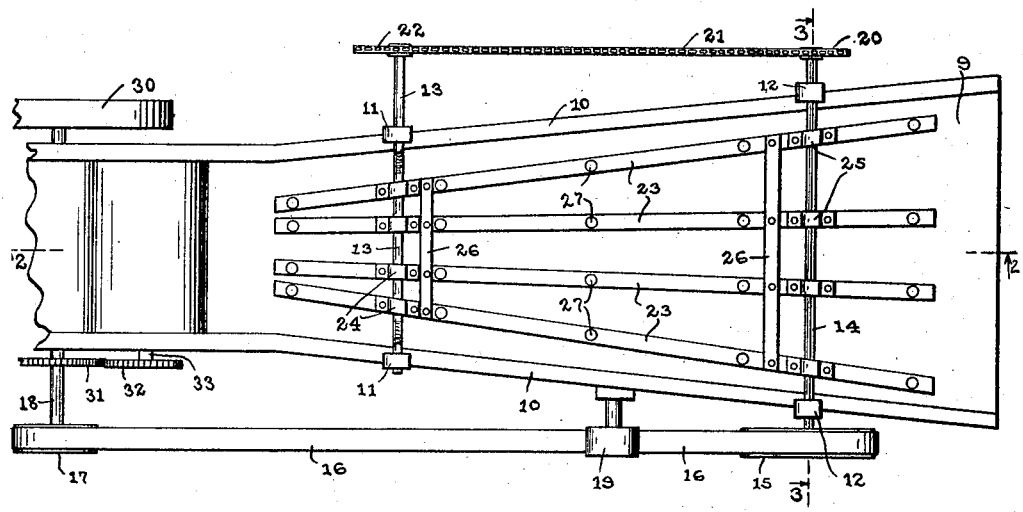
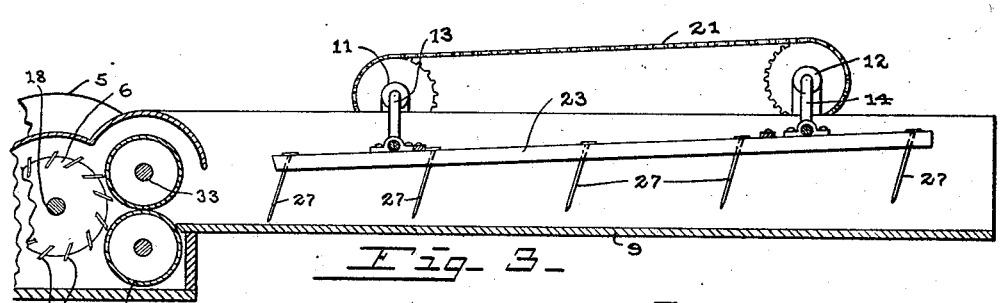
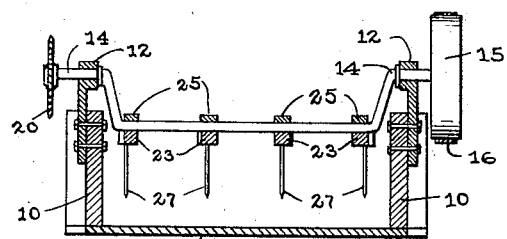
INVENTOR.
Frank Kolarik
BY Morsell & Keeney
ATTORNEYS.

Patented May 15, 1923.

1,455,402

UNITED STATES PATENT OFFICE.

FRANK KOLARIK, OF MANITOWOC COUNTY, WISCONSIN.

SELF-FEEDER FOR FEED CUTTERS.

Application filed December 9, 1922. Serial No. 605,877.

*To all whom it may concern:*

Be it known that I, FRANK KOLARIK, a citizen of the United States, and resident of the county of Manitowoc and State of Wisconsin, have invented new and useful Improvements in Self-Feeders for Feed Cutters, of which the following is a description, reference being had to the accompanying drawings, which are a part of this specification.

This invention relates to automatic feeding mechanisms for feed cutters, and has for one of its objects to provide a simple and efficient device adapted to feed corn, cotton, or other stalks to a cutting mechanism, whereby they may be cut into suitable lengths for stock feed.

Feed cutting devices of this character usually comprise a rotatable cutter having associated with it a pair of feeding rolls which are adapted to pass the material between them to the said cutter, to the end that the said material may be positively fed. However, it is necessary in such devices that the material be inserted between the said feeding rolls, and as this necessarily requires manual labor it is very desirable to provide a mechanism which will automatically feed the stalks to the said rolls. It is therefore an important object of the present invention to provide a mechanism which will automatically and positively present the corn, cotton or other stalks to the feeding rolls, whereby they may be merely deposited in a trough or receptacle in any shape, whereupon the machine will automatically feed them to the cutting mechanism.

A further object of the invention is to provide an automatic feeding mechanism which will be simple in construction, comparatively inexpensive to manufacture, and which may be readily attached either to machines which are already in use or to new machines.

With the above and other objects in view, which will appear as the description proceeds, the invention consists in the novel details of construction and combinations of parts more fully hereinafter disclosed and particularly pointed out in the appended claims.

Referring to the accompanying drawing in which like numerals designate like parts in all the views;

Figure 1 is a plan view of a mechanism made in accordance with the present invention, showing the same attached to a rotary feed cutting machine;

Fig. 2 is a central vertical sectional view, taken approximately on the plane indicated by the line 2—2 of Fig. 1, looking in the direction of the arrows; and, Fig. 3 is a vertical cross-sectional view, taken approximately on the plane indicated by the line 3—3 of Fig. 1, looking in the direction of the arrows.

In the said drawings the numeral 5 indicates generally any suitable feed cutting machine which may be provided with a rotatable cutter member or drum 6, provided with a plurality of cutting knives 7, suitably arranged around its periphery. A pair of rotatable feed rolls 8 is provided in close proximity to the cutting roll 6, and these said rolls are adapted to pass the corn, cotton or other stalks between them to the cutting blades 7 of the said roll 6, whereby they may be severed into suitable lengths for stock feed.

The feeding attachment comprising the present invention consists of a trough or receptacle 9, provided with the walls 10, which preferably converge substantially as shown in Fig. 1, and upon which are mounted suitable bearings 11 and 12, in which are journalled respectively the crank members, 13 and 14. The said crank member 14 carries a pulley 15 around which passes a belt or other drive mechanism 16, which also passes around a pulley 17, carried by a shaft 18, upon which the cutter roll 6 is mounted. A suitable belt tightener pulley 19 may be provided for automatically maintaining a suitable tension upon the said belt 16.

The said crank shaft 14 is also provided with a sprocket wheel 20 which is engaged by a sprocket chain 21, which latter also passes around a sprocket wheel 22, carried by the crank shaft 13, whereby the two crank shafts, 13 and 14, may be driven in unison.

The crank portions of the shafts, 13 and 14, carry a plurality of longitudinally extending ridge bars 23 which may converge substantially as shown in Fig. 1, which bars are provided with suitable straps or bearings, 24 and 25, for engagement with the said crank shafts, 13 and 14. The said bars 23 are maintained in suitable spaced relation by means of transverse spacing members 26, and the said bars are each provided with a plurality of downwardly extending inclined teeth or spikes 27, which are adapted to engage and feed the stalks forwardly, as will presently appear.

The shaft 18 of the feed cutting machine proper is provided with a drive pulley 30 whereby power may be applied thereto from any suitable source, not shown, and the said shaft also carries a gear wheel 31, meshing with the gear wheel 32, carried by the shaft 33, upon which is mounted the upper feed rolls 8, whereby the said rolls may be positively driven.

The operation of the improved feeding device will be clear from the foregoing, but it may be briefly summarized as follows. The corn, cotton or other stalks being deposited in the receptacle or trough 9 in any manner, and the machine being set in operation, the crank members, 13 and 14, will be rotated in a clockwise direction, thereby carrying the ridge bars 23 around with a substantially circular motion. The spikes or teeth 27, carried by the said bars, will engage the stalks in the trough 9 and will feed the same toward the left as seen in Fig. 2, thereby bringing the ends of the said stalks into engagement with the surfaces of the feed rolls 8, which will grasp them and feed them forward to the cutting roll 6, where they will be severed in suitable lengths for stock feed. As the motion of the cranks, 13 and 14 is continued, the ridge bars 23 will be lifted, thus disengaging the spikes or teeth 27, and they will then be returned to the right, as seen in Fig. 2, and brought downwardly to again engage the stalks. The operation will be continued, of course, as long as power is supplied to the pulley 30, and the stalks will thus be intermittently fed to the feed rolls 8, which will in turn feed them to the cutter 6 practically continuously.

It will be noted that the bearing members 12 are somewhat higher than the bearing members 11 and since the crank members, 13 and 14, have substantially the same throw, it results that the ridge bars 23 are somewhat inclined, as clearly indicated in Fig. 2, so that their left or discharge end is lower than their right or intake end. It thus results that the stalks will be positively engaged and fed forwardly regardless of how little stalk material is in the trough or receptacle 9.

It will be noted that the side walls 10 of the receiving trough 9 converge, and that the ridge bars 23 are so spaced as to extend substantially the full width of the said trough. The said bars are furthermore all mounted in substantially the same horizontal plane, so that when actuated in conjunction with the trough having the converging side walls, they serve to efficiently compress all material which may be within the trough during their forward operation. It thus results that while such material is fed to the feed rolls 8 uniformly throughout their width the maximum efficiency of the cutters or knives 7 is obtained.

It will be thus seen that this invention provides a simple and effective means for automatically feeding the cotton, corn, or other stalks to a feed cutting mechanism, and that the said feeding device may be readily and efficiently applied to either the feed cutting machines which are already in use or to new machines.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. In a feeding mechanism of the class described, a receptacle having converging side walls for receiving the material to be fed; a pair of crank members rotatably mounted on the walls of said receptacle, one of said crank members being disposed higher than the other; a plurality of converging ridge bars all in substantially the same horizontal plane carried by said crank members, said bars being inclined relative to the bottom of said receptacle; angularly disposed pins carried by said ridge bars, for engaging the material to be fed; and means for rotating said crank members in unison.

2. The combination with a feed cutting machine having a cutting member and a pair of coacting feeding rolls, of means for positively feeding material to said rolls, comprising a trough having converging side walls adapted to receive the material to be fed; crank members mounted in different horizontal planes upon the sides of said trough; inclined converging ridge bars spaced to extend substantially the full width of said trough, and all in substantially the same horizontal plane carried by said crank members, and provided with angularly disposed pins for engaging the material to be fed; and means for rotating said cutting member, said feed rolls, and said crank members simultaneously, whereby the latter members may cause said bars and pins to engage and feed said material forward to said rolls, and to then disengage themselves and return to their initial positions.

In testimony whereof, I affix my signature.

FRANK KOLARIK.